United States Patent [19]

Mortimore et al.

[11] Patent Number: 4,900,114
[45] Date of Patent: Feb. 13, 1990

[54] TECHNIQUE FOR REDUCING FIBRE JOINT LOSS

[75] Inventors: David B. Mortimore, Felixstowe; David B. Payne, Wickham Market, both of England

[73] Assignee: British Telecommunications, plc., London, England

[21] Appl. No.: 116,078
[22] PCT Filed: Feb. 13, 1987
[86] PCT No.: PCT/GB87/00109
§ 371 Date: Sep. 29, 1987
§ 102(e) Date: Sep. 29, 1987
[87] PCT Pub. No.: WO87/05118
PCT Pub. Date: Aug. 27, 1987

[30] Foreign Application Priority Data

Feb. 14, 1986 [GB] United Kingdom ................ 8603672

[51] Int. Cl.[4] .............................................. G02B 6/26
[52] U.S. Cl. ................................ 350/96.15; 350/96.21
[58] Field of Search ........................... 350/96.15, 96.21

[56] References Cited

U.S. PATENT DOCUMENTS

| | | | |
|---|---|---|---|
| 3,579,316 | 5/1971 | Dyott et al. ................ | 350/96.15 X |
| 4,201,447 | 5/1980 | Thompson et al. .......... | 350/96.15 X |
| 4,252,403 | 2/1981 | Salisbury ................... | 350/96.15 |
| 4,798,436 | 1/1989 | Mortimore ................. | 350/96.15 |

FOREIGN PATENT DOCUMENTS

| | | | |
|---|---|---|---|
| 0076186 | 4/1983 | European Pat. Off. ........ | 350/96.15 |
| 3407820 | 11/1985 | Fed. Rep. of Germany . | |
| 1252126 | 11/1971 | United Kingdom ............ | 350/96.15 |

OTHER PUBLICATIONS

*Electronics Letters*, "Low-Loss Joints Between Dissimilar Fibres by Tapering Fusion Splices", D. B. Mortimore et al., vol. 22, No. 6, Mar. 13, 1986, pp. 318-319.
*Electronics Letters*, "Tapered-Beam Expander for Single-Mode Optical-Fiber Gap Devices", K. P. Jedrzeuewski et al., vol. 22, No. 2, Jan. 16, 1986, pp. 105-106.
Electronics Letters, vol. 22, No. 6, Mar. 13, 1986 (Hitchin Herts, GB), D. B. Mortimore et al., "Low Loss Joints Between Dissimilar Fibres by Tapering Fusion Splices", p. 318.
Electronics Letters, vol. 22, No. 2, Jan. 16, 1986 (Hitchi Herts, GB), K. P. Jedrzejewski et al., "Tapered-Beam Expander for Single-Mode Optical-Fibre Gap Devices", pp. 105, 106.
Applied Optics, vol. 21, No. 7, Apr. 1, 1982, (New York, U.S.A.), Yasuyuki Kato et al., "Arc-Fusion Splicing of Single-Mode Fibers.1: Optimun Splice Conditions", pp. 1332-1336.

Primary Examiner—John D. Lee
Assistant Examiner—Phan T. Heartney
Attorney, Agent, or Firm—Nixon & Vanderhye

[57] ABSTRACT

A technique for reducing splice loss between similar or dissimilar optical fibres. Two fibers (10,11) are joined by fusion splicing and the joint region is tapered until the cladding assumes a guiding function. This produces a mode transformer which covers the fundamental mode of one fibre to that of the other with little or negligible loss.

12 Claims, 3 Drawing Sheets

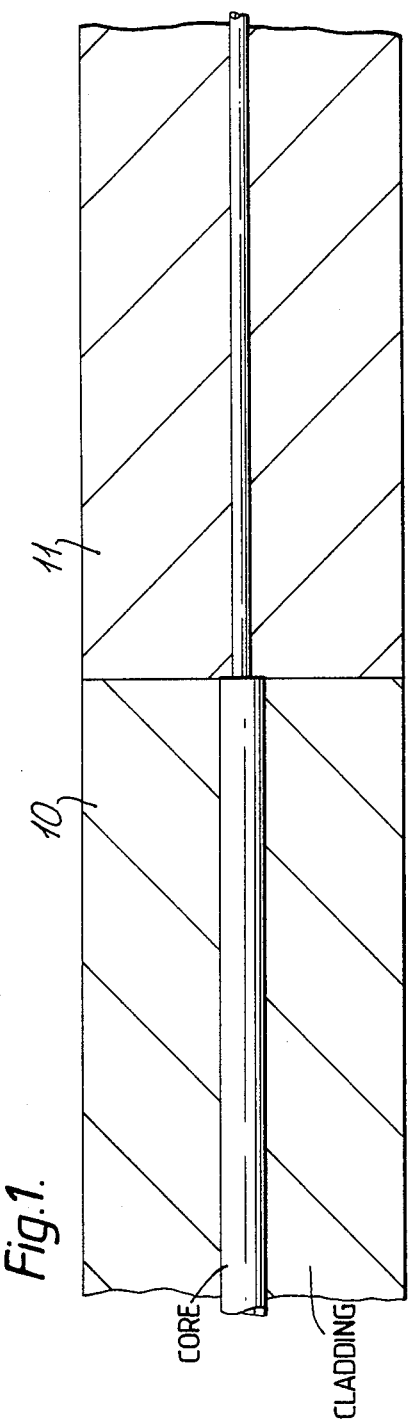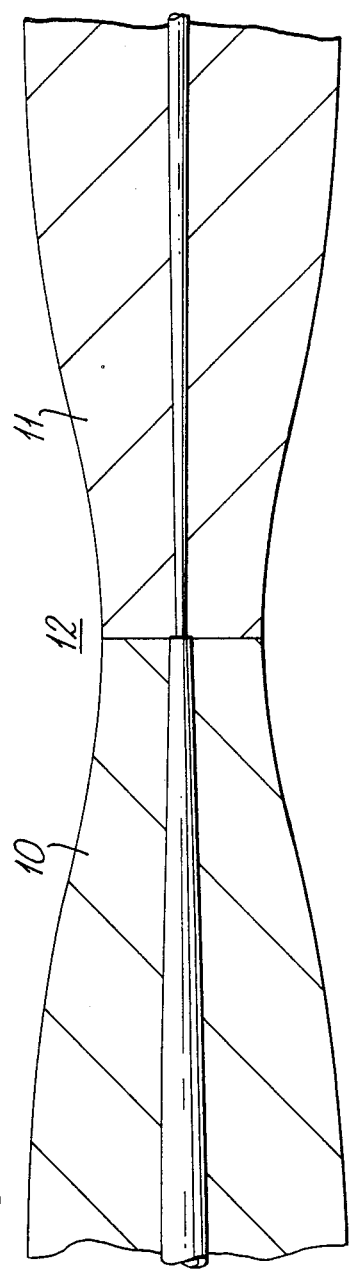

Fig. 3.
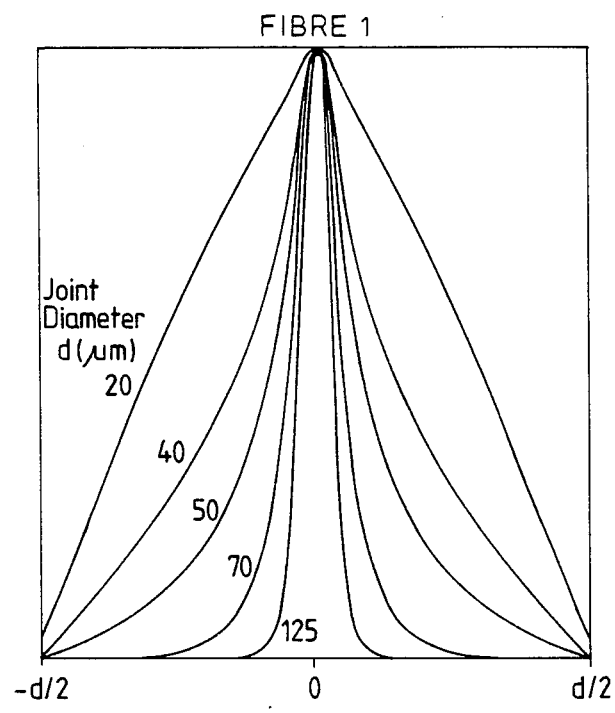
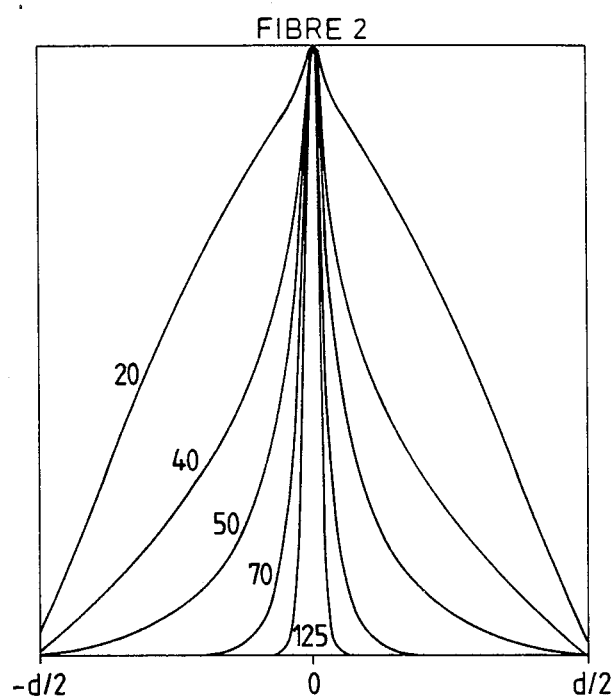

TECHNIQUE FOR REDUCING FIBRE JOINT LOSS

This invention relates to optical fibre joints.

It is important in optical fibre communication systems to be able to provide joints with very low losses between optical fibres. At present, standard single mode fibre is used both for transmission purposes and for connection to devices such as lasers, receivers and integrated optic components. Low loss joints between fibres of the same type are readily achievable, with fusion splicing, for example. By using this common fibre, low loss joints between the devices and the transmission fibre can be obtained.

Unfortunately, however, the standard system fibre is not usually the optimum fibre for connecting to these devices as a large proportion of optical power is lost due to difficulties in coupling the optical mode of the device to the fundamental mode of the standard fibre. An improved coupling can be achieved by carefully selecting the refractive index profile of the fibre to suit the particular device which is being coupled to. Although this special fibre allows low loss coupling of the modes this power advantage is lost due to the higher joint losses when this fibre is spliced to a standard transmission fibre.

To obtain a low loss joint between two optical fibres the mode fields of each fibre must match at the splice junction. In practice this means that the fibres must have identical refractive index profiles with no relative tilt or offset between them. Losses due to tilt and offset when jointing fibres of the same type can be reduced to small values by using high quality splicing techniques. Such a technique which reduces jointing losses between fibres of the same kind is described, for example, in published European Patent Application No. 82401668.7 (Thomson CSF). The technique described there consists, essentially, in tapering the two fibre ends and jointing the reduced diameter ends of the fibres. The reduction in core diameter at the joint face commensurate with the reduction in overall fibre diameter is said to reduce the sensitivity of the joint to angular and lateral misalignments. However even with such high quality splicing techniques, losses due to dissimilar refractive index profiles are still present. Such losses will occur when a special fibre of the type referred to above is spliced with the standard transmission fibre.

An object of the present invention is to provide a jointing technique in which fibres of different propagation properties can be joined with a low loss joint.

According to one aspect of the present invention there is provided an optical fibre joint between two generally co-axial fibres having different refractive index profiles in which the adjacent end portions of the fibres are tapered to such an extent that at least a proportion of the optical energy which is normally guided in the fibre core is guided by the cladding of the fibres, at least in the waist of the tapered region. The guidance by the cladding results in a greater proportion of optical power being coupled into the fundamental mode of the receptor fibre.

The expression "is guided by the cladding" should be interpreted on the basis that, as will be readily understood by the person skilled in the art of optical fibres, in an unmodified single mode fibre the energy is guided by the core, and the core also carries the major part of the transmitted optical energy, with however, a small fraction being carried by the cladding in the vicinity of the core. However, in this case the cladding has no guiding function. As the energy progresses into the tapered region, the relative proportions of the optical energy carried by the core and cladding progressively change as the core region gets smaller, with the result that an increasing amount of energy propagates through the cladding. Below a certain core size the field has expanded sufficiently for the cladding to assume itself a guiding function.

The extent to which the fibres are tapered depends upon the difference of the field profiles of the two fibres and the joint loss which is acceptable. With increasing taper of the fibres the optical field eventually becomes bounded by the cladding external medium interface and the original fibre cores play little part in the guidance. The mode fields in this region are nearly identical for the two fibres; thus the light propagates across the joint with little loss. As the light propagates away from the joint towards the larger diameter portion of the taper the light becomes recaptured in the core region of the receptor fibre. In effect the joint operates as a mode transformer which converts the fundamental mode of one fibre to that of the other.

According to another aspect of the present invention there is provided a method of forming an improved optical fibre fusion joint by fusing the end portions of two co-axial fibres and pulling the joint whilst the end portions are soft to form the tapered regions.

A further aspect of the invention provides a method of improving a pre-existing fusion joint between two generally co-axial optical fibres comprising the steps of heating the joint region so that it softens and whilst it is soft pulling the joint region so that the adjacent end portions of the fibres become tapered.

Thus, there are no increased handling difficulties with this method as compared to making a conventional fibre joint, since the fibres are fused whilst still being of their original diameter.

The invention will be described now by way of example only with particular reference to the accompanying drawings. In the drawings:

FIG. 1 is a section through a fibre joint during its formation;

FIG. 2 is a section through a fibre joint in accordance with the present invention;

FIG. 3 are plots of the electric field intensity at different points along the length of the joint.

Figure 4:
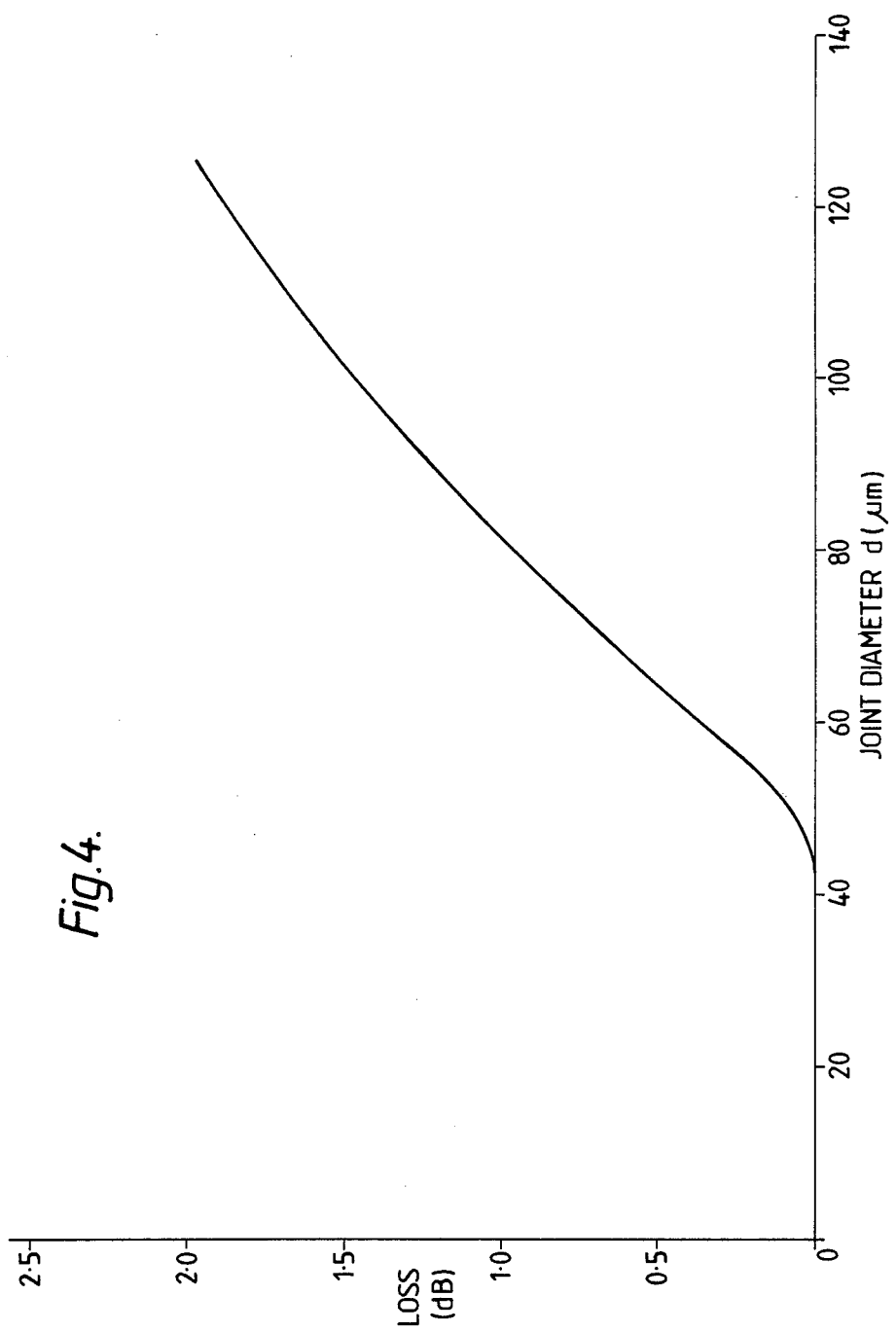
FIG. 4 is a plot of estimated joint loss as a function of joint diameter.

The first step in making a low loss joint in accordance with the present invention is to fusion splice two fibres 10,11 in a conventional way. Referring to FIG. 1 the fibres to be joined are located in end to end relationship and heated so that they fuse together. Then while the joint region is soft the fibres are pulled so that a tapered region is formed at the joint as shown in FIG. 2. The joint region is tapered to such an extent that as light propagates towards the waist region 12 of the taper its optical field expands into the cladding as the fibre core diminishes in size. Ultimately the optical field will become bounded by the cladding and the fibre cores play only a small part in the guidance of the optical radiation. The light instead propagates along the guide formed by the cladding/air interface. As the mode fields of these tapered fibres are nearly identical the light propagates across the splice with little loss. The light then continues to propagate away from the waist region and towards the increasing diameter region of the taper where the light then becomes re-captured by the increasing core of the receptor fibre. Provided the taper angles are kept small the tapered splice behaves adiabatically and there is negligible change in mode power through the device.

The extent to which the fibres are tapered depends upon the difference in field profiles of the fibres and the acceptable loss of the joint. In the majority of cases it is envisaged that at the narrowest part of the taper the cladding diameter will be less than 50%, preferably 40% to 90% of the original diameter or less. It may be even below 10% of the original diameter. A convenient compromise between loss reduction and joint fragility will often lie at a diameter of the order of 25% of the original.

To illustrate the operation of the tapered splice it is possible to calculate the mode fields for the two fibres at the splice junction, as a function of fibre diameter. The overlap integral of the mode fields can then be calculated to give a good estimate of the power loss across the splice. Consider two fibres which have physical and optical parameters as given in table 1. The fundamental mode field shape for these fibres is plotted in FIG. 3 for various fibre diameters at 1.3 μm. As the fibre diameter is reduced the field width increases as expected. The fibre diameter at which the field distribution is greater than 0 at the cladding boundary corresponds to the diameter at which the cladding assumes a guiding function.

FIG. 4 shows the estimated joint loss as a function of fibre diameter obtained from the overlap integral calculation. The joint loss is seen to decrease rapidly with reducing diameter to reach a value less than 0.1 dB at a fibre diameter of 50 μm, ie approximately 40% of the original diameter. As the fibre diameter is reduced further the joint loss is seen to approach zero. It is interesting to note that, for the two fibres chosen, a negligible loss is reached with a taper diameter of reasonable size.

An example of the use of this technique will now be given. A low loss splice is made between a standard systems fibre and a small core high NA fibre. The fibre parameters are given in table 1. The two fibres were carefully spliced together by fusion in the usual way to produce a splice loss of 1.5 dB at 1.3 μm and 0.97 dB at 1.52 μm. The splice was then tapered by heating the fibres whilst applying a tension. The splice loss was reduced to 0.56 dB and 0.46 dB at 1.3 μm and 1.52 μm respectively. Further pulling of the joint resulted in no further reduction in splice loss. This can probably be explained by the splice moving out of the heating region during the tapering process and by the fact that the fibres had slightly different softening temperatures which caused the waist to form to one side of the splice.

Several Applications are envisaged for the joint described above. There could be a range of standard components for providing low loss connection between transmission fibre and various optical devices such as semi-conductor lasers, fibre lasers and integrated optic components fabricated from lithium niobate or Group III-V semi-conductor technology.

It should also be appreciated that the technique of splicing and then pulling can be used to reduce loss in splices formed between the same or nearly identical fibre.

A splice with a loss of 0.7 dB was made between two fibres similar to fibre 1 of Table 1. The high loss was achieved by splicing fibre with poor end angles. The splice was tapered to produce a minimum loss of 0.15 dB. Again despite further pulling no further reduction in splice loss was seen due to the splice moving out of the heating region during the tapering process.

In some instances, e.g. where the waist region is of very small diameter, it may be necessary to encapsulate the joint in a suitable compound in order to protect it.

The technique may also be used to improve existing joints which have coupling deficiency. The existing joint is heated so that it softens and is then pulled to form a tapered region as described above. This produces a joint having the characteristics already described.

TABLE 1

|  | STANDARD FIBRE (Fibre 1) | SMALL CORE HIGH NA FIBRE (Fibre 2) |
| --- | --- | --- |
| CLADDING DIAMETER | 125 | 125 μm |
| CORE DIAMETER | 8.9 | 3.8 μm |
| CORE INDEX | 1.4542 | 1.468 |
| FIELD WIDTH (1/e² Diameter) | 9.86 | 4.34 μm |

We claim:

1. An optical fibre joint between two generally co-axial optical fibres having different refractive index profiles in which the adjacent end portions of the fibres are tapered to such an extent that at least a proportion of the optical energy which is normally guided in the fibre core is guided by the cladding of the fibres, at least in the waist of the tapered region.

2. An optical fibre joint as claimed in claim 1 herein the joint has been formed by fusion splicing.

3. An optical fibre joint as claimed in claim 1 or claim 2 wherein the fibres have different propagation constants.

4. A method of forming an optical fibre joint between fibres of different refractive index profiles, which includes tapering adjacent end portions of the fibres to be joined such that at least a proportion of the optical energy which is normally guided in the fibre core is guided by the cladding of the fibres, at least in the waist of the tapered region.

5. A method as of forming an optical fibre joint as in claim 4 wherein the joint is formed by fusing the end portions of two co-axial fibres and whilst the end portions are soft pulling the joint to form the tapered regions.

6. A method as claimed in claims 4 or 5 wherein the fibres have different propagation constants.

7. A method of improving a joint between two generally co-axial optical fibres of different refractive index profiles, said method comprising the steps of heating the joint region so that it softens and whilst it is soft pulling the joint region so that the adjacent end portions of the fibres become tapered sufficiently that at least a proportion of the optical energy which is normally guided in the fibre core is guided by the cladding of the fibres, at least in the waist of the tapered region.

8. An optical fibre joint produced by a method according to any one of claims 4, 5 or 7.

9. A method of forming a low loss optical fibre joint between first and second mono-mode optical fibers having respectively different refractive index profiles defining their respective cores and claddings and therefore exhibiting respectively different fundamental modes of optical propagation via their cores, said method comprising:

fusing a free end of said first optical fiber coaxially to a free end of said second optical fiber; and thereafter drawing apart the fused ends of said fibers so as to simultaneously taper the joined ends to reduced diameter waist sections at the joint sufficiently to cause optical energy passing through the joint to be guided by the claddings of each fibre rather than by the cores of each fibre in said waist sections whereby optical signal propagation in a first mode along the core of said first fibre is transformed during passage along said waist regions into optical signal propagation in a different second mode along the core of said second fibre.

10. A method as in claim 9 wherein said waist sections have a diameter between 40% and 90% of the original fibre diameters.

11. A method as in claim 9 wherein said waist sections have a diameter approximately 25% of the original fibre diameters.

12. A low loss optical fibre joint mode by the method of claim 9.

* * * * *

UNITED STATES PATENT AND TRADEMARK OFFICE
CERTIFICATE OF CORRECTION

PATENT NO. : 4,900,114

DATED : 13 February 1990

INVENTOR(S) : David B. Mortimore, David B. Payne

It is certified that error appears in the above-identified patent and that said Letters Patent is hereby corrected as shown below:

TITLE PAGE:
Page 1, line [73] Assignee: should read --British Telecommunications public limited company--.

Signed and Sealed this

Twenty-third Day of April, 1991

Attest:

HARRY F. MANBECK, JR.

*Attesting Officer*   Commissioner of Patents and Trademarks